United States Patent
Hiscox et al.

Patent Number: 6,036,152
Date of Patent: *Mar. 14, 2000

[54] CONTAINER HOLDER FOR A MOTOR VEHICLE

[75] Inventors: Ian Hiscox, Coventry; Alan Francis Sheppard, Redditch, both of United Kingdom

[73] Assignee: Rover Group Limited, Warwick, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 09/095,788

[22] Filed: Jun. 11, 1998

[30] Foreign Application Priority Data

Jun. 21, 1997 [GB] United Kingdom .................. 9713030

[51] Int. Cl.⁷ .................. A47K 1/08; A47C 7/62; B60R 7/00
[52] U.S. Cl. .................. 248/311.2; 297/188.17; 224/281; 224/282; 224/926
[58] Field of Search .................. 248/311.2; 224/281, 224/282, 926; 297/188.07, 188.11, 188.16, 188.17, 188.19

[56] References Cited

U.S. PATENT DOCUMENTS

| | | | |
|---|---|---|---|
| 4,759,584 | 7/1988 | Dykstra et al. | 297/194 |
| 4,907,775 | 3/1990 | Lorence et al. | 248/311.2 |
| 5,014,956 | 5/1991 | Kayali | 248/311.2 |
| 5,018,633 | 5/1991 | Toth et al. | 248/311.2 |
| 5,248,183 | 9/1993 | Gignac et al. | 297/188.16 |
| 5,297,709 | 3/1994 | Dykstra et al. | 248/311.2 |
| 5,505,417 | 4/1996 | Plocher | 248/311.2 |
| 5,618,018 | 4/1997 | Baniak | 248/311.2 |
| 5,692,718 | 12/1997 | Bieck | 248/311.2 |
| 5,791,617 | 8/1998 | Boman et al. | 248/311.2 |
| 5,829,726 | 11/1998 | Withum | 248/311.2 |

FOREIGN PATENT DOCUMENTS 2 241 872  9/1991  United Kingdom .

*Primary Examiner*—Derek J. Berger
*Assistant Examiner*—Michael Nornberg
*Attorney, Agent, or Firm*—Davis and Bujold

[57] ABSTRACT

A container holder is described having a support member (9) that is both pivotally and slidingly attached to a frame (14) attached to part of the body structure (13) of a motor vehicle. The support member (9) is moveable from a stored or concealed position to an in use position by a combination of sliding and pivotal movement with respect to the frame (14).

6 Claims, 3 Drawing Sheets

CONTAINER HOLDER FOR A MOTOR VEHICLE

FIELD OF THE PRESENT INVENTION

This invention relates to a container holder for a motor vehicle.

BACKGROUND OF THE PRESENT INVENTION

It is well known to provide a container holder for a motor vehicle to support a cup or can containing drink while the vehicle is in motion.

It is a problem with such prior art container holders that they are complicated and expensive to manufacture. In addition they are difficult to fit unless there is considerable space behind the trim panel to which they are attached.

BRIEF SUMMARY OF THE PRESENT INVENTION

According to the invention there is provided a container holder for a motor vehicle, the holder having a frame for attachment to part of the body structure of the motor vehicle and a support member movably connected to said frame, the support member having a first portion defining an aperture into which a container to be supported can be inserted and an end portion defining a handle used to move the support member from a stored position in which it is nested substantially vertically within said frame to an in use position in which the support member extends substantially horizontally from said frame wherein the support member is connected to the frame by a sliding pivot means that allows the support member to be moved from said stored position upwardly within said frame until the majority of the support extends vertically therefrom before being rotated to said horizontal in use position.

A lower edge of the support member may rest upon an upper edge of the frame in said in use position.

The end portion of the support member may form a door in said stored position to conceal the first portion of the support member from view.

A stirrup support may be pivotally connected to the support member to provide a resting platform for a container placed in said aperture.

The sliding pivot means may comprise a pair of opposing tracks attached to said frame and a pair of pivot pins attached to opposite sides of the support member.

BRIEF INTRODUCTION OF THE DRAWINGS

The invention will now be described by way of example with reference to the accompanying drawing of which:

FIG. 1 pictorial view of a container holder according to the invention in a stored position;

DESCRIPTION OF THE PRESENT INVENTION

Figure 1:
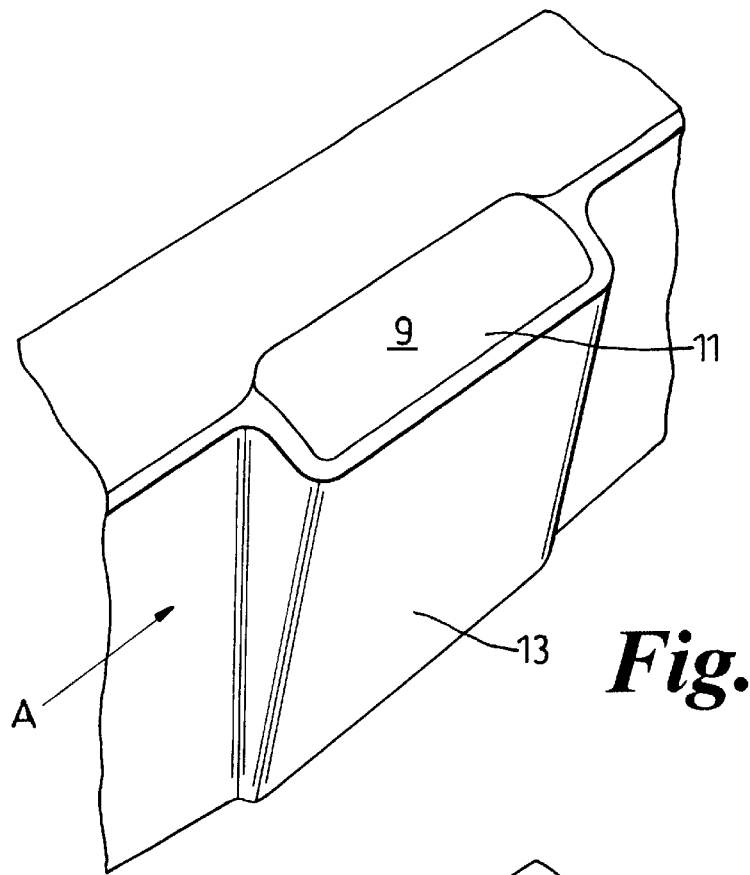

With reference to the figures there is shown a container holder for a motor vehicle having a frame 14 (the frame having a U-shaped cross section comprising diverging sides whereby the frame forms an open end which is wider than a closed end of the U-shaped frame) which is attached to part of the body structure of the motor vehicle in the form of a trim panel 13 by attachment means (not shown). A support member 9 is movably connected to the frame 14 by means of a sliding pivot means in the form a pair of pivot pins 16 which are engaged with a track 15 attached to the frame 14.

The support member 9 has a first portion 10 defining an aperture 19 into which a container to be supported can be inserted and an end portion 11 defining a handle. The handle is used to move the support member 9 from a stored position in which it is nested substantially vertically within said frame 14 to an in use position in which the support member 9 extends substantially horizontally from said frame 14.

A U-shaped stirrup support 12 is pivotally connected by pivot pins 18 to the support member 9. The stirrup support 12 is used to provide a lower resting platform upon which a container placed in said aperture 19 can rest.

Figure 3:
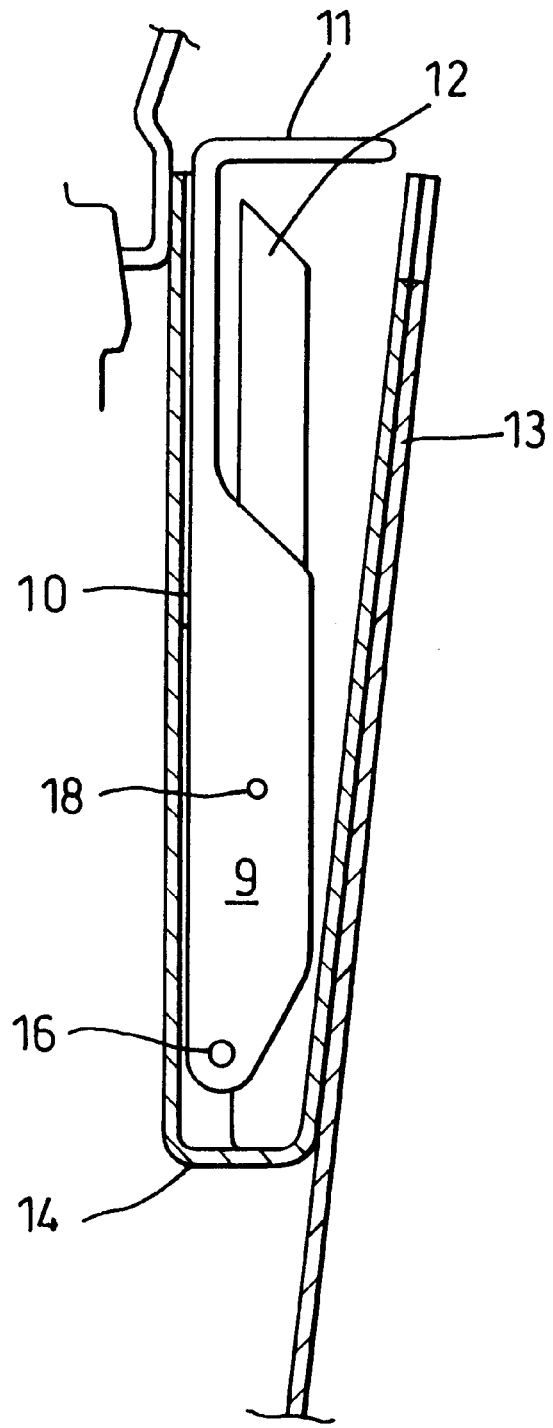
FIG. 3 is a cut-away side view in the direction of arrow A on FIG. 1 showing the container holder in a stored position.

When in the stored position (as shown in FIGS. 1 and 3) the support member 9 is located within the frame 14 and the stirrup support 12 is folded up adjacent to the first portion 10 of the support member 9. In this position the end portion 11 conceals both the interior of the frame and the first portion 10 of the support member 9 from view by forming a door which abuts against an upper edge 21 of the frame 14.

To move the support member 9 into a container receiving or in use position the support member is first displaced vertically upward so that the two pivot pins 16 attached to opposite sides of the support member 9 slide along the opposing tracks 15 attached to the frame 14.

Figure 2:
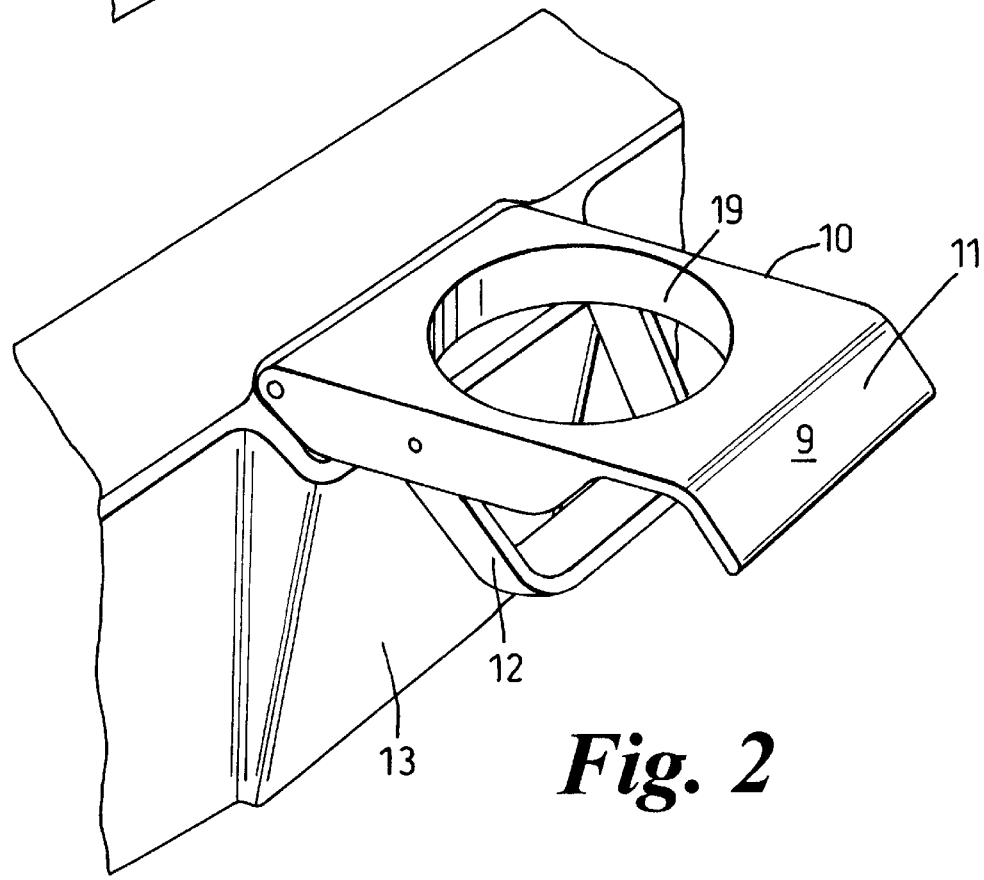
FIG. 2 is a pictorial representation of a container holder according to the invention in an in use position.
Figure 4:
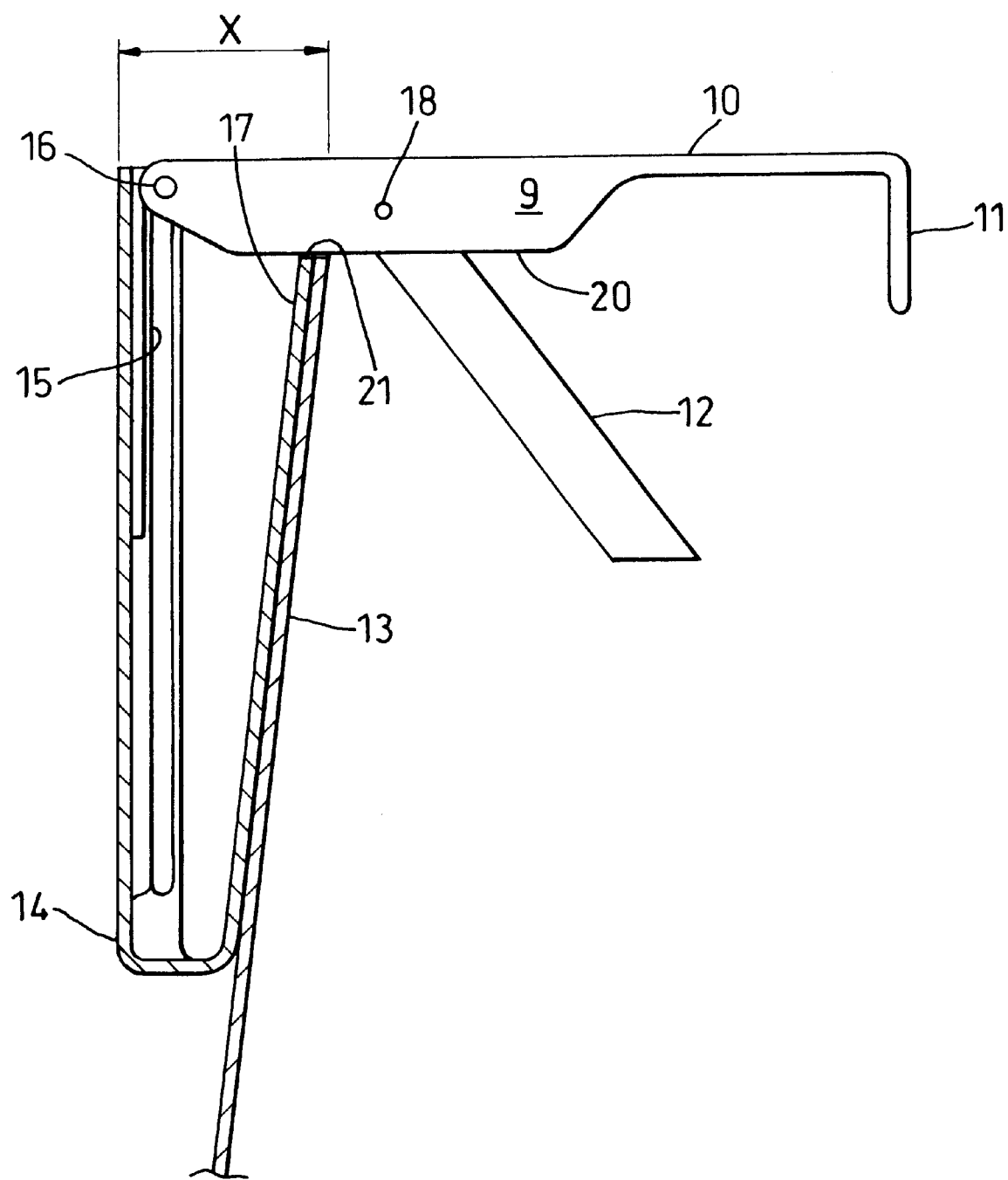
FIG. 4 is a view similar to that of FIG. 3 but showing the container holder in an in use position-corresponding to that shown in FIG. 2.

The support member 9 can then be rotated from the vertical position to a horizontal position (as shown in FIGS. 2 and 4) such that a lower edge 20 of the support member 9 rests upon the upper edge 21 of the frame 14. During transition from the vertical to the horizontal position the stirrup member 12 folds down under the action of gravity to adopt the position shown in FIGS. 2 and 4.

In this position a cup or can of drink can be placed in the aperture 19 to rest upon the stirrup support 12 and movement of the cup or can is constrained in a horizontal position by the aperture 19 and in the vertical position by the stirrup support 12 and gravity which acts so as to hold the cup or can onto the stirrup support 12.

It will therefore be appreciated that the above container holder provides a simple but effective way of supporting a cup or can in a motor vehicle that can be contained within a very small volume and in particular the depth of the container holder as shown by "X" on FIG. 4 is much reduced compared to a conventional sliding container holder. In addition it will be appreciated that a container holder according to this invention is fitted into a horizontally extending surface rather than a vertically extending surface.

We claim:

1. A container holder for a motor vehicle, the holder comprising:
    a substantially U-shaped frame for attachment to an interior of a motor vehicle, the U-shaped frame having opposed first and second side walls and opposed end walls which together define an interior well, the opposed first and second side walls diverging from one another to form an open end that is wider than a closed end of the U-shaped frame, and the second side wall defining a longitudinal axis;
    a support member being movably supported within the interior well of the U-shaped frame, the support member having a planar central portion defining an aperture therein for accommodating a container, a free end portion of the support member forming a handle facilitating movement of the support member from a stored position, in which the support member is completely nested within the interior well of the U-shaped frame, to an in use position, in which the support member extends from the interior well substantially horizontally relative to the second side wall;

one of end of the support member being connected to the U-shaped frame by a sliding pivot supported by a surface of the second side wall, the sliding pivot being arranged to permit the support member to move from the stored position substantially only longitudinally along the interior well of the U-shaped frame until a majority of the support member projects from the open end of the U-shaped frame and the sliding pivot thereafter permits the support member to rotate to the in use position in which a lower edge of the support member abuts against the upper edge of the first side wall of the U-shaped frame such that the central portion extends perpendicular to the second side wall of the U-shaped frame with the pivoted end portion of support member extending from the slidable pivot across and substantially covering the open end of the U-shaped frame.

2. A container holder according to claim 1, wherein the free end portion of the support member forms a door for the container holder and the door, when the support member is in the stored position, conceals the support member from view.

3. A container holder according to claim 1, wherein a stirrup support is pivotally connected to the support member to provide a resting platform for a container when placed in the aperture.

4. A container holder according to claim 1, wherein the sliding pivot comprises a pair of opposed tracks attached to an inwardly facing surface of the second side and a pair of pivot pins are attached to opposed sides of the support member, and the pair of pivot pins are captively retained by the pair of opposed tracks to facilitate movement of the support member within the interior well.

5. A container holder integral with interior trim of a motor vehicle for deployment within a passenger compartment of a motor vehicle for securely holding a drinking container of a passenger of the motor vehicle, the container holder comprising:

a substantially U-shaped frame attached to an interior of a motor vehicle, the U-shaped frame having opposed first and second side walls and opposed end walls which together define an interior well, the opposed first and second side walls diverging from one another to form an open end that is wider than a closed end of the U-shaped frame, and the second side wall defining a longitudinal axis;

a support member being movably supported within the interior well of the U-shaped frame, the support member having a planar central portion defining an aperture therein for accommodating a supporting, in combination with a pivotal stirrup support, a container when placed in the aperture, a free end portion of the support member forming an integral handle which forms a door of the container holder which facilitates movement of the support member from a stored position, in which the support member is completely nested within the interior well of the U-shaped frame, to an in use position, in which the support member extends from the interior well substantially horizontally relative to the second side wall, and the door, when the support member is in the stored position, conceals the support member from view;

one of end of the support member being connected to the U-shaped frame by a sliding pivot supported by an inwardly facing surface of the second side wall, the sliding pivot being arranged to permit the support member to move from the stored position substantially only longitudinally along the interior well of the U-shaped frame until a majority of the support member projects from the open end of the U-shaped frame and the sliding pivot, thereafter, permitting the support member to rotate to the in use position in which a lower edge of the support member, adjacent the pivoted end, abuts against the upper edge of the first side wall of the U-shaped frame such that the central portion extends perpendicular to the second side wall of the U-shaped frame with the pivoted end portion of support member extending from the slidable pivot across and substantially covering the open end of the U-shaped frame.

6. A container holder integral with interior trim of a motor vehicle for deployment within a passenger compartment of a motor vehicle for securely holding a drinking container of a passenger of the motor vehicle, the container holder comprising:

a substantially U-shaped frame attached to an interior of a motor vehicle in a substantially vertical orientation, the U-shaped frame having opposed first and second side walls and opposed end walls which together define an interior well, the opposed first and second side walls diverging from one another to form an open end that is wider than a closed end of the U-shaped frame, and the second side wall defining a vertical longitudinal axis, the second wall extends vertically above the first wall;

a support member being movably supported within the interior well of the U-shaped frame, the support member having a planar central portion defining an aperture therein for accommodating a supporting, in combination with a pivotal stirrup support, a container when placed in the aperture, a free end portion of the support member forming an integral handle which forms a door of the container holder which facilitates movement of the support member from a vertical stored position, in which the support member is completely nested within the interior well of the U-shaped frame, to a horizontal in use position, in which the support member extends from the interior well substantially horizontally relative to the second side wall, and the door, when the support member is in the stored position, conceals the support member from view;

one of end of the support member being connected to the U-shaped frame by a sliding pivot supported by an inwardly facing surface of the second side wall, the sliding pivot being arranged to permit the support member to move from the stored position substantially only vertically longitudinally along the interior well of the U-shaped frame until a majority of the support member projects from the open end of the U-shaped frame vertically above the upper edge of the first side wall and the sliding pivot, thereafter, permitting the support member to rotate to the horizontal in use position in which a lower edge of the support member, adjacent the pivoted end, abuts against the upper edge of the first side wall of the U-shaped frame such that the central portion extends perpendicular to the second side wall of the U-shaped frame in a cantilevered manner with the pivoted end portion of support member extending from the slidable pivot across and substantially covering the open end of the U-shaped frame.

* * * * *